United States Patent
Liao et al.

(10) Patent No.: US 12,435,182 B2
(45) Date of Patent: Oct. 7, 2025

(54) MANUFACTURING METHOD OF POLYESTER FOR PLASTIC WRAP

(71) Applicant: NAN YA PLASTICS CORPORATION, Taipei (TW)

(72) Inventors: Te-Chao Liao, Taipei (TW); Jung-Jen Chuang, Taipei (TW); Tzu-Huan Wong, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 477 days.

(21) Appl. No.: 18/081,708

(22) Filed: Dec. 15, 2022

(65) Prior Publication Data

US 2024/0158570 A1    May 16, 2024

(30) Foreign Application Priority Data

Nov. 11, 2022  (TW) .................................. 111143216

(51) Int. Cl.
  *C08G 63/183*   (2006.01)
  *C08J 5/18*     (2006.01)
  *C09D 167/02*   (2006.01)

(52) U.S. Cl.
  CPC ............. *C08G 63/183* (2013.01); *C08J 5/18* (2013.01); *C09D 167/02* (2013.01); *C08J 2367/02* (2013.01)

(58) Field of Classification Search
  CPC .......... C08G 63/183; C08G 63/78; C08J 5/18; C08J 2367/02; C09D 167/02
  See application file for complete search history.

(56) References Cited

U.S. PATENT DOCUMENTS

| | | | | |
|---|---|---|---|---|
| 4,062,907 A | * | 12/1977 | Sublett ................... | C09J 167/00 156/332 |
| 5,332,617 A | * | 7/1994 | Mills ....................... | B32B 27/36 428/483 |
| 5,382,652 A | * | 1/1995 | Fukuda .................. | C09J 167/00 156/308.2 |

(Continued)

FOREIGN PATENT DOCUMENTS

| JP | S56125445 | 10/1981 |
|---|---|---|
| JP | H04306239 | 10/1992 |

(Continued)

OTHER PUBLICATIONS

Hong-Bing Tsai et al., "Copolyesters with Different Molecular Weights Controlled by p-Phenylbenzoic Acid", Journal of The Chin. I. Ch. E., Nov. 1989, pp. 313-317, vol. 20, No. 6.

(Continued)

*Primary Examiner* — Doris L Lee
(74) *Attorney, Agent, or Firm* — JCIPRNET

(57) ABSTRACT

A manufacturing method of a polyester for a plastic wrap at least includes the following steps. An aromatic carboxylic acid, an aliphatic carboxylic acid, and an aliphatic alcohol are provided, wherein the aromatic carboxylic acid includes at least two of a phthalic acid, an isophthalic acid, and a terephthalic acid. The aromatic carboxylic acid, the aliphatic carboxylic acid and the aliphatic alcohol are subjected to at least an esterification reaction, a pre-polymerization reaction, and a polymerization reaction in sequence, so as to obtain a polybutylene adipate terephthalate.

7 Claims, 1 Drawing Sheet

Provide an aromatic carboxylic acid, an aliphatic carboxylic acid and an aliphatic alcohol, wherein the aromatic carboxylic acid includes at least two of a phthalic acid, an isophthalic acid, and an terephthalic acid — S100

Obtain a polybutylene adipate terephthalate by subjecting the aromatic carboxylic acid, the aliphatic carboxylic acid, and the aliphatic alcohol to at least an esterification reaction, a pre-polymerization reaction and a polymerization reaction in sequence — S200

(56) References Cited

U.S. PATENT DOCUMENTS

2015/0183927 A1* 7/2015 Kang .................... C08G 63/78
528/302

FOREIGN PATENT DOCUMENTS

| JP | 2011057972 | 3/2011 |
| JP | 2012188548 | 10/2012 |
| JP | 2018510260 | 4/2018 |
| JP | 2020527634 | 9/2020 |
| JP | 2023048440 | 4/2023 |

OTHER PUBLICATIONS

"Office Action of Taiwan Counterpart Application", issued on May 22, 2023, p. 1-p. 7.
"Office Action of Japan Counterpart Application", issued on Mar. 19, 2024, p. 1-p. 4.

* cited by examiner

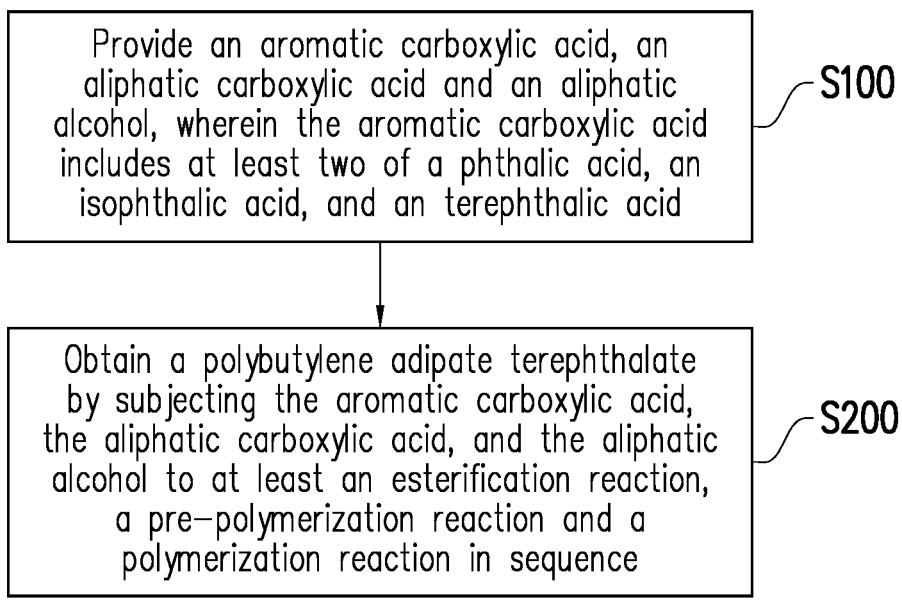

MANUFACTURING METHOD OF POLYESTER FOR PLASTIC WRAP

CROSS-REFERENCE TO RELATED APPLICATION

This application claims the priority benefit of Taiwan application serial no. 111143216, filed on Nov. 11, 2022. The entirety of the above-mentioned patent application is hereby incorporated by reference herein and made a part of this specification.

BACKGROUND

Technical Field

The disclosure relates to a manufacturing method of a polyester for a plastic wrap.

Description of Related Art

Generally speaking, the materials used for plastic wraps in the past were non-biodegradable materials, such as polyvinylchloride (PVC) or polyethylene (PE). With the gradual improvement of the public's awareness of environmental protection, the public began to choose green and environmentally friendly biodegradable materials, such as polybutylene adipate terephthalate (PBAT), to replace the aforementioned non-biodegradable materials. However, due to the poor physical properties (e.g., extensibility, softness and resilience, etc.) of polybutylene adipate terephthalate, the application of polybutylene adipate terephthalate for a plastic wrap is limited.

SUMMARY

The disclosure provides a manufacturing method of a polyester for a plastic wrap, which can improve the physical properties of polybutylene adipate terephthalate, and further enhance its applicability to a plastic wrap.

The disclosure provides a manufacturing method of a polyester for a plastic wrap that at least includes the following steps. An aromatic carboxylic acid, an aliphatic carboxylic acid, and an aliphatic alcohol are provided, wherein the aromatic carboxylic acid includes at least two of a phthalic acid, an isophthalic acid, and a terephthalic acid. The aromatic carboxylic acid, the aliphatic carboxylic acid and the aliphatic alcohol are subjected to at least an esterification reaction, a pre-polymerization reaction, and a polymerization reaction in sequence, so as to obtain a polybutylene adipate terephthalate.

In an embodiment of the present disclosure, the aliphatic carboxylic acid includes one or more of a C4-C10 dicarboxylic acid.

In an embodiment of the present disclosure, the aliphatic alcohol includes one or more of a C4-C12 diol.

In an embodiment of the present disclosure, in the aromatic carboxylic acid, a ratio of a total number of moles of the phthalic acid and the isophthalic acid to a number of moles of the terephthalic acid ranges from 0.01:0.99 to 0.5:0.5.

In an embodiment of the present disclosure, in the aromatic carboxylic acid, a ratio of a number of moles of the phthalic acid to a number of moles of the isophthalic acid ranges from 0:1 to 1:0.

In an embodiment of the present disclosure, in the polybutylene adipate terephthalate, a ratio of a number of moles of the aromatic carboxylic acid to a number of moles of the aliphatic carboxylic acid ranges from 0.55:0.45 to 0.2:0.8.

In an embodiment of the present disclosure, in the polybutylene adipate terephthalate, a ratio of a total number of moles of the aromatic carboxylic acid and the aliphatic carboxylic acid to a number of moles of the aliphatic alcohol ranges from 45:55 to 55:45.

In an embodiment of the present disclosure, the aromatic carboxylic acid and the aliphatic carboxylic acid have a total added amount, and a ratio of an added amount of the aliphatic carboxylic acid to the total added amount ranges from 45 mol % to 80 mol %.

In an embodiment of the present disclosure, the polybutylene adipate terephthalate is applied to a plastic wrap.

In an embodiment of the present disclosure, the polybutylene adipate terephthalate accounts for more than 95 wt % of the plastic wrap.

Based on the above, the present disclosure improves the manufacturing method of a polyester. By designing the starting materials in which terephthalic acid is partially replaced by phthalic acid and/or isophthalic acid, the obtained polybutylene adipate terephthalate has a bent molecular shape, a lower arrangement, and a reduced crystallinity. Accordingly, the physical properties (such as self-adhesiveness and/or resilience) of the polybutylene adipate terephthalate of the disclosure are improved, so as to enhance its applicability to a plastic wrap.

In order to make the above-mentioned features and advantages of the present disclosure more comprehensible, the following specific embodiments are described in detail together with the accompanying drawings.

BRIEF DESCRIPTION OF THE DRAWINGS

The FIGURE is a schematic flow chart of a manufacturing method of a polyester for a plastic wrap according to an embodiment of the present disclosure.

DESCRIPTION OF THE EMBODIMENTS

In the following detailed description, for purposes of explanation and not limitation, exemplary embodiments disclosing specific details are set forth to provide a thorough understanding of various principles of the disclosure. However, it should be apparent to people having ordinary skills in the art that the disclosure may be practiced in other embodiments that depart from the specific details disclosed herein. Furthermore, descriptions of well-known devices, methods, and materials may be omitted so as not to obscure the description of various principles of the disclosure.

A range can be described herein as from ""about"" one specific value to ""about"" another specific value, and can also be directly described as one specific value and/or to another specific value. When expressing the range, another embodiment includes one specific value and/or to another specific value. Similarly, it should be understood that when an antecedent ""about"" is used to express an approximate value, the specific value establishes another embodiment. Further, it should be understood that an endpoint of each range is manifestly related or unrelated to the other endpoint.

In this disclosure, non-limiting terms (for example, may, can, such as, or other similar terms) mean unnecessary or optional implementations, inclusions, additions, or existence.

Unless otherwise defined, all terms (including technical and scientific terms) used herein have the same meanings as commonly understood by people having ordinary skills in the art. Further, it should be understood that technical terms (such as those defined in commonly used dictionaries) should be interpreted consistently in the related technical context and should not be interpreted in an idealized or an overly formal sense, unless the terms are clearly defined as such.

The FIGURE is a schematic flow chart of a manufacturing method of a polyester for a plastic wrap according to an embodiment of the present disclosure. Referring to the FIGURE, in step S100, an aromatic carboxylic acid, an aliphatic carboxylic acid and an aliphatic alcohol are provided, wherein the aromatic carboxylic acid includes at least two of a phthalic acid, an isophthalic acid and a terephthalic acid. Next, in step S200, the aromatic carboxylic acid, the aliphatic carboxylic acid, and the aliphatic alcohol are at least subjected to an esterification reaction, a pre-polymerization reaction, and a polymerization reaction in sequence, so as to obtain a polybutylene adipate terephthalate. Accordingly, this embodiment improves the manufacturing method of a polyester. By designing the starting materials in which terephthalic acid is partially replaced by phthalic acid and/or isophthalic acid, the obtained polybutylene adipate terephthalate has a bent molecular shape, a lower arrangement, and a reduced crystallinity. Accordingly, the physical properties (such as self-adhesiveness and/or resilience) of the polybutylene adipate terephthalate of the disclosure are improved, so as to enhance its applicability to a plastic wrap.

In some embodiments, the polybutylene adipate terephthalate is applied to a plastic wrap, and the polybutylene adipate terephthalate accounts for more than 95 wt % of the plastic wrap, for example. The polybutylene adipate terephthalate produced by the polyester manufacturing method of this embodiment has improved physical properties, and therefore, it is not necessary to mix with other additives such as biodegradable polymers or fillers in order to meet the requirements of the plastic wrap, wherein the mixing additives may include acrylate for improving ductility and/or glycerin for improving softness and adhesion, but the disclosure is not limited thereto.

In some embodiments, in the aromatic carboxylic acid, a ratio of the total number of moles of phthalic acid and isophthalic acid to the number of moles of terephthalic acid ranges from 0.01:0.99 to 0.5:0.5 (e.g., 0.01:0.99, 0.05:0.95, 0.1:0.9, 0.2:0.8, 0.3:0.7, 0.4:0.6, 0.5:0.5 or any ratio between 0.01:0.99 and 0.5:0.5). In some embodiments, in the aromatic carboxylic acid, a ratio of the number of moles of phthalic acid to the number of moles of the isophthalic acid ranges from 0:1 and 1:0 (e.g., 0:1, 0.1:0.9, 0.3:0.7, 0.5:0.5, 0.7:0.3, 0.9:0.1, 1:0 or any ratio between 0:1 and 1:0). That is to say, one or both of the phthalic acid and the isophthalic acid can be added, but the present disclosure is not limited thereto. The proportions of the phthalic acid, the isophthalic acid, and the terephthalic acid in the aromatic carboxylic acid can be determined or adjusted according to actual design requirements, and these proportions fall within the scope of the present disclosure, as long as the aromatic carboxylic acid includes at least two of the phthalic acid, the isophthalic acid and the terephthalic acid.

In some embodiments, the aliphatic carboxylic acid includes one or more of a C4-C10 dicarboxylic acid. For example, the aliphatic carboxylic acid includes one or more of Adipic acid, Succinic acid, Glutaric acid, Pimelic acid, Suberic acid, Azelaic acid and Sebacic acid, but the present disclosure is not limited thereto.

In some embodiments, in the polybutylene adipate terephthalate, a ratio of the number of moles of aromatic carboxylic acid to the number of moles of aliphatic carboxylic acid ranges from 0.55:0.45 to 0.2:0.8 (e.g., 0.55:0.45, 0.5:0.5, 0.4:0.6, 0.3:0.7, 0.2:0.8 or any ratio between 0.55:0.45 and 0.2:0.8), but the present disclosure is not limited thereto.

In some embodiments, when the amount of the aliphatic carboxylic acid is increased, the softness and self-adhesiveness (i.e., the ability of the material adhered to the surface of the object) of the polybutylene adipate terephthalate can be further improved. Therefore, the added amount of aliphatic carboxylic acid to the total added amount of aromatic carboxylic acid and aliphatic carboxylic acid ranges from 45 mol % to 80 mol % (e.g., 45 mol %, 55 mol %, 65 mol %, 75 mol %, 80 mol % or any value between 45 mol % and 80 mol %), but the present disclosure is not limited thereto.

In some embodiments, the aliphatic alcohol includes one or more of a C4-C12 diol (including a straight chain or a branched chain). For example, the aliphatic alcohol includes 1,4-butanediol (14-BG), 1,4-cyclohexanedimethanol, isosorbide, one or more of 2,4:3,5-Di-O-methylene-D-glucitol, but the present disclosure is not limited thereto.

In some embodiments, in the polybutylene adipate terephthalate, the total number of moles of the aromatic carboxylic acid and the aliphatic carboxylic acid to the number of moles of the aliphatic alcohol ranges from 45:55 and 55:45 (e.g., 45:55, 50:50, 55:45 or any ratio between 45:55 to 55:45), but the present disclosure is not limited thereto.

In some embodiments, when a C6-C12 long-chain aliphatic diol is added, the softness and self-adhesiveness of polybutylene adipate terephthalate can be further improved. For example, the ratio of the added amount of a C6-C12 long-chain aliphatic diol to the total amount of aliphatic alcohol ranges from 0 mol % to 50 mol % (e.g., 5 mol %, 10 mol %, 20 mol %, 30 mol %, mol % or any ratio between 0 mol % and 50 mol %), but the present disclosure is not limited thereto.

Details of each reaction and other optional reactions in step S200 of the FIGURE will be further described below. It should be noted that, for people having ordinary skills in the art, the parameters, the sequence and the manufacturing method of the following steps can be adjusted according to actual needs. The following steps are merely provided as examples and are not intended to limit the present disclosure.

Esterification Reaction

In some embodiments, the reaction temperature of the esterification reaction may range from 160° C. to 220° C., and the pressure may be normal pressure (about 760 Torr). For example, the esterification reaction can be carried out with the following steps. In Step (1), a 2 L reaction bottle (with four necks) is provided, a mechanical stirrer is inserted into the reaction bottle from the top neck, and the other three necks are respectively configured for a nitrogen gas inlet, a thermocouple insertion port for temperature control, and a Dean-stark device. In Step (2), aromatic carboxylic acid, aliphatic carboxylic acid and aliphatic alcohol are sequentially weighted and put into the reaction flask. In Step (3), the reaction bottle is put in a heating bag, the nitrogen flow rate is set to 40 ml/min, and the temperature is set to 190° C.; when the temperature is raised to 100° C., the stirrer is started and the speed is set at 100 rpm; when the temperature is raised to 140° C., the speed of the stirrer is set at 200 rpm; and when the temperature is raised to 190° C., the reaction is carried out for 1 hour to measure the acid value, and the esterification rate is calculated and therefore confirmed to be greater than 70%. In Step (4), when the temperature is raised to 220° C., the reaction is continued for 1.5 hours, samples are taken to measure the acid value, and the esterification rate is calculated and therefore confirmed to be greater than 90%.

Pre-Polymerization Reaction

In some embodiments, the reaction temperature of the pre-polymerization reaction may range from 160° C. to 220° C., and the pressure may be less than 100 Torr. For example, the pre-polymerization reaction can be carried out with the following steps. In Step (1), the temperature is controlled to 180° C., the titanium catalyst (e.g., titanium (IV) butoxide), titanium(IV) methoxide, titanium(IV) propoxide, titanium (IV) isopropoxide, titanium (IV) ethoxide, titanium (IV) tert-butoxide, or titanium (IV) 2-ethylhexyloxide) is weighted and added to the reaction. In Step (2), a vacuum pump is used to evacuate to less than 100 Torr, and after the pressure is stable, the temperature is raised to 190° C., and the reaction is reacted for 1 hour. In Step (3), when the vapor is no longer evaporated, the temperature is raised to 220° C. and/or 230° C. and the reaction is reacted for 30 minutes. In Step (4), the temperature is lowered to 200° C., the vacuum pump is turned off to break the vacuum with nitrogen, the stirrer and temperature control device are removed, and the PBAT pre-polymer is poured out and cooled for later use.

Polymerization Reaction

In some embodiments, the reaction temperature of the polymerization reaction may range from 230° C. to 250° C., and the pressure may be less than 1 Torr. For example, the polymerization reaction can be carried out with the following steps. In Step (1), the PBAT pre-polymer obtained in the pre-polymerization reaction is put into a 2 L polymerization tank. In Step (2), the feed port is closed after feeding is completed, and the nitrogen is turned on to replace the air in the tank (for 10 minutes). In Step (3), the temperature is set to 200° C., and the rotation speed is gradually adjusted to 60 rpm. In Step (4), when the temperature and rotation speed reach the target values, the vacuum pump switch is turned on, and the pressure is dropped to less than 1 Torr. In Step (5), when the vacuum value reaches the target, the temperature is set to 245° C. to 250° C., so as to observe the change of the reaction torque value. In Step (6), when the torque value reaches the predetermined target, the vacuum pump is turned off, and nitrogen gas is introduced to bring the system back to normal pressure. In Step (7), if no subsequent other reactions are performed, the bottom valve of the reaction tank is opened to discharge the material, and the PBAT product is obtained. Herein, the polymerization reaction can also be carried out with optionally addition of a suitable catalyst to assist the reaction, but the present disclosure is not limited thereto.

In some embodiments, a chain extension reaction may be optionally performed after Step (7) of the above polymerization reaction. Furthermore, the reaction temperature of the chain extension reaction may range from 150° C. to 200° C., and the pressure may be normal pressure (about 760 Torr). For example, the chain extension reaction can be performed with the following steps. The temperature of the reaction tank is lowered to 200° C., nitrogen gas is continuously introduced, the rotation speed of the stirring shaft is maintained at 60 rpm, and the chain extender is added into the reaction tank and reacted for 5 minutes to 20 minutes. The chain extender includes, for example, isocyanate such as hexamethylene diisocyanate, 4,4'-diisocyanato-methyl-enedicyclohexane, etc., and/or ADR series such as DR4468, ADR4368, ADR4370, etc. The bottom valve of the reaction tank is opened to discharge, and the PBAT product is obtained.

The following Table 1 provides the compositions of the polyester and the corresponding performance data (the numerical unit of the materials shown in Table 1 is "wt %"), so as to realize the manufacture method of above-mentioned polyester of the present disclosure. However, these data are exemplary, and the present disclosure is not limited to these examples. The comparative examples are #1 and #4 (using only terephthalic acid). Herein, "self-adhesiveness (adhesion)" in Table 1 is tested by cutting a plastic wrap (with thickness of 7 μm to 15 μm, for example) produced by the obtained PBAT material into 3 cm*10 cm pieces, two pieces of plastic wrap films are taken and pasted with a 1 Kg roller (normal temperature), and a tensile testing machine is then used to analyze the peel strength of the material. The higher the value, the better the self-adhesiveness, and the better the adhesion between the film and the film. Herein, "resilience" in Table 1 is evaluated by using a rotational rheometer. The evaluation method includes performing a tensile test with a rotational rheometer. The sample size of 1 cm (wide)*10 cm (long) is stretched to 10% deformation (for example, 10 cm stretched to 11 cm) with the rotational rheometer (25° C.), the force (F1) required to maintain this deformation is measured, this deformation is maintained until 120 seconds later and the force (F2) required to maintain this deformation is recorded, and F2/F1*100%/cis the defined resilience. It should be noted that when the resilience is high, it means that it is easy to return to a previous condition when stretched, which in turn causes the problem of having difficulty to conformally stick to the object.

TABLE 1

| No | Item | | #1 | #2 | #3 | #4 | #5 | #6 |
|---|---|---|---|---|---|---|---|---|
| 1 | PBAT plastic wrap composition | terephthalic acid | 33.7 | 27.0 | 27.0 | 23.9 | 19.1 | 17.9 |
| 2 | | phthalic acid | 0.0 | 6.7 | 0.0 | 0.0 | 4.8 | 4.5 |
| 3 | | isophthalic acid | 0.0 | 0.0 | 6.7 | 0.0 | 0.0 | 0.0 |
| 4 | | 1,6-hexanedioic acid | 29.7 | 29.7 | 29.7 | 39.1 | 39.1 | 36.6 |
| 5 | | 1,4-butanediol | 36.6 | 36.6 | 36.6 | 37.0 | 37.0 | 14.6 |
| 6 | | 1,6-hexanediol | 0.0 | 0.0 | 0.0 | 0.0 | 0.0 | 26.4 |
| 7 | self-adhesiveness (adhesion) | g/30 mm | 4.2 | 5.7 | 5.6 | 6.2 | 7.4 | 7.9 |
| 8 | resilience | % | 75.6 | 60.4 | 61.1 | 68.1 | 53.2 | 49.5 |

In summary, the present disclosure improves the manufacturing method of a polyester. By designing the starting materials in which terephthalic acid is partially replaced by phthalic acid and/or isophthalic acid, the obtained polybutylene adipate terephthalate has a bent molecular shape, a lower arrangement, and a reduced crystallinity. Accordingly, the physical properties (such as self-adhesiveness and/or resilience) of the polybutylene adipate terephthalate of the disclosure are improved, so as to enhance its applicability to a plastic wrap.

Although the present disclosure has been disclosed above with the embodiments, it is not intended to limit the present disclosure. Anyone with ordinary knowledge in the technical field may make some changes and modifications without departing from the spirit and scope of the present disclosure.

The scope of protection of the present disclosure should be defined by the scope of the appended patent application.

What is claimed is:

1. A manufacturing method of a polyester for a plastic wrap, comprising:
   providing an aromatic carboxylic acid, an aliphatic carboxylic acid and an aliphatic alcohol, wherein the aromatic carboxylic acid comprises at least two from the group consisting of a phthalic acid, an isophthalic acid, and a terephthalic acid; and
   obtaining a polybutylene adipate terephthalate by subjecting the aromatic carboxylic acid, the aliphatic carboxylic acid, and the aliphatic alcohol to at least an esterification reaction, a pre-polymerization reaction and a polymerization reaction in sequence,
   wherein in the polybutylene adipate terephthalate, a ratio of a number of moles of the aromatic carboxylic acid to a number of moles of the aliphatic carboxylic acid ranges from 0.55:0.45 to 0.2:0.8, and the polybutylene adipate terephthalate accounts for more than 95 wt % of the plastic wrap.

2. The manufacturing method of claim 1, wherein the aliphatic carboxylic acid comprises one or more of a C4-C10 dicarboxylic acid.

3. The manufacturing method of claim 1, wherein the aliphatic alcohol comprises one or more of a C4-C12 diol.

4. The manufacturing method of claim 1, wherein in the aromatic carboxylic acid, a ratio of a total number of moles of the phthalic acid and the isophthalic acid to a number of moles of the terephthalic acid ranges from 0.01:0.99 to 0.5:0.5.

5. The manufacturing method of claim 1, wherein in the aromatic carboxylic acid, a ratio of a number of moles of the phthalic acid to a number of moles of the isophthalic acid ranges from 0:1 to 1:0.

6. The manufacturing method of claim 1, wherein in the polybutylene adipate terephthalate, a ratio of a total number of moles of the aromatic carboxylic acid and the aliphatic carboxylic acid to a number of moles of the aliphatic alcohol ranges from 45:55 to 55:45.

7. The manufacturing method of claim 1, wherein the aromatic carboxylic acid has a first added amount. the aliphatic carboxylic acid has a second added amount, and a ratio of the second added amount to a sum of the first added amount and the second added amount ranges from 45 mol % to 80 mol %.

* * * * *